United States Patent

[11] 3,615,807

[72] Inventor Paul Clifford Yates
Wilmington, Del.
[21] Appl. No. 812,443
[22] Filed Apr. 1, 1969
[45] Patented Oct. 26, 1971
[73] Assignee E. I. du Pont de Nemours and Company
Wilmington, Del.

[54] POSITIVELY CHARGED FIBROUS CERIUM PHOSPHATE
7 Claims, No Drawings
[52] U.S. Cl.................................................. 106/288 B,
23/15, 23/18, 106/297, 106/299, 106/302,
106/304, 252/437, 252/462
[51] Int. Cl....................................................... C09c 1/00,
C09c 1/14, C09c 1/36
[50] Field of Search........................................... 106/288 B,
297, 299, 302, 304; 23/15, 15 W, 18, 20, 105;
252/437, 462, 477

[56] References Cited
UNITED STATES PATENTS
2,449,050 9/1948 Bond et al..................... 252/462
OTHER REFERENCES
Applicant's non-Pat. Citation Alberti et al., Crystalline Insoluble Salts of Polybasic Metals- III, Preparation and Ion Exchange Properties of Cerium (IV) Phosphate of Various Crystallinities, J. of Inorg. and Nuclear Chemistry, Jan. 1968, Vol. 30, No. 1, pp. 295- 304. (Sci. Lib. Q.D. 601.A1)

Primary Examiner—James E. Poer
Attorney—Norbert F. Reinert

ABSTRACT: The positively charged fibrous cerium phosphates of this invention comprise colloidal fibrous crystalline cerium phosphate which contains at least 5 mole percent based on the number of moles of phosphorous of at least one +3 or +4 valent metal ion from the group of titanium, zirconium, hafnium, chromium, molybdenum, tungsten, manganese, aluminum, iron, cobalt, cerium, the rare earths, thorium, tin and lead.

3,615,807

POSITIVELY CHARGED FIBROUS CERIUM PHOSPHATE

SUMMARY OF THE INVENTION

This invention relates to compositions of matter containing as essential ingredients colloidal fibrous crystalline cerium phosphate exhibiting a positive charge in aqueous solution which must contain at least 5 mole percent based on the number of moles of phosphorus contained in the cerium phosphate, of a tri- or a tetravalent metal ion selected from the group of titanium, zirconium, hafnium, chromium, molybdenum, tungsten, manganese, aluminum, iron, cobalt, cerium, the rare earths, thorium, tin, and lead, and which optionally may also contain from 5 to 200 mole percent based on the moles of such metal ions, of an organic acid selected from the group of alkyl, aryl, chlorine-substituted alkyl or aryl, fluorine-substituted alkyl or aryl carboxylates, sulfates, phosphates, phosphonates, sulfonates and thiosulfates, to processes for preparing such compositions involving contacting a soluble salt of one of the metal substituents with a previously prepared fibrous cerium phosphate for a period sufficient to cause the substitution of such metal ions into the structure of and in place of the hydrogen atoms of the fibrous cerium phosphate, in a pH region not less than 3 pH units below nor more than 1.5 pH units above the precipitation point of the corresponding polyvalent metal hydroxide, and recovering the metal-substituted fibrous cerium phosphate, to processes for chemically reacting such substituted fibrous cerium phosphates with the previously mentioned organic acids, and to uses of such compositions as reinforcing agents for plastics and fibers, to prepare hydrophobic fibrous papers, threads, cloth, as ion exchange papers, as refractory fibers, and as organoinorganic plastics.

DESCRIPTION OF THE INVENTION

As essential ingredient of the components of the invention is the colloidal fibrous cerium phosphates which can be prepared by heating an aqueous solution of ceric sulfate and concentrated phosphoric acid, as disclosed in an article in the Journal of Inorganic and Nuclear Chemistry, Jan. 1968, 30, No. 1, pp. 294-304, Pergamon Press, Ltd., London by G. Alberti. et al. These are crystalline, cylindrical colloidal fibers, having a negative charge when dispersed in aqueous solution, the fiber diameter of which is of the order of from 5 to 50 millimicrons for the individual fibers, and the fiber length of which can vary from a few hundred to many thousand millimicrons. These compositions have the approximate formula of two phosphate groups for each cerium atom, although this can vary within reasonable limits in terms of containing somewhat less phosphate per cerium atom. Such compositions are crystalline rather than amorphous in character. The compositions of this invention are prepared from those disclosed in the above article by a reaction within the pH limits described above with suitable quantities, which will be described hereafter, of soluble polyvalent metal salts selected from the group described above.

In addition to preparing the fibrous cerium metaphosphates by the procedures described in the above article, other procedures have been found to be applicable to the preparation of such material. For example, it is possible to autoclave these materials at higher temperatures under pressure and substantially increase the length of the fibers, and it has not been found necessary to restrict oneself to the relatively dilute solution and slow addition techniques disclosed in the article; since rapid addition of quantities even exceeding by a factor of 10 those disclosed in the article may be employed, if followed by subsequent heating, and still obtain similar compositions.

A second essential ingredient of the compositions of this invention are +3 or +4 valent metal ions selected from the group of chromium, aluminum, molybdenum, tungsten, titanium, zirconium, hafnium, manganese, iron, cobalt, cerium, the rare earths, thorium, tin and lead. Of these, titanium zirconium, chromium, aluminum, iron, +3 valent cobalt, cerium, and tin are preferred. These essential ingredients are used in the form of their soluble salts to contact an aqueous dispersion of the colloidal cerium phosphates so as to bring about a partial or total replacement of the hydrogen ions in the cerium phosphate structure with the polyvalent metal ions just described. It has been found that such a replacement will not occur to an appreciable extend unless the pH of the solutions of the polyvalent transition metal ions are maintained within certain critical limits. These limits broadly are from 3 pH units below to 1½ pH units above the precipitation point of the hydroxide of the polyvalent transition metal slat when the salt solution is contacted with an alkaline hydroxide. It is preferred to bring the reactants together within a pH range which is no more than 2 pH units below and no more than 1 pH unit above the precipitation point of the metal hydroxide of the replacing metal ion.

In order to achieve the compositions of the invention it is necessary to have the previously mentioned metal ions either in a +3 or a +4 valence state. Certain metal ions of this group can exhibit a variety of different valence states ranging all the way from +2 in the case of cobalt and iron to positive valences as high as +6 in the case of chromium, molybdenum or tungsten. Valences which are less than 3 or greater than 4 are not preferred for the purposes of this invention.

The transition polyvalent metal ions may be substituted into the structure of the fibrous cerium phosphates in amounts ranging from 5 mole percent based on the moles of phosphorus contained in the fibrous cerium phosphate to several hundred mole percent. The degree of substitution achieved will depend upon the time of contact, the concentration of polyvalent metal salt in solution, the temperature, and the pH. Extensive substitution is favored by a high concentration of polyvalent metal ions, long contact times, higher temperatures, and higher pH's. At pH's near or slightly in excess of the precipitation pH for the corresponding polyvalent transition metal hydroxide, the substitution is essentially quantitative and relatively small amounts of such ions as 5-10 percent or greater may be quantitatively incorporated into the structure. At pH's greatly below the precipitation pH of polyvalent metal hydroxide, such as 3 pH units below, for example, substantial excesses of the polyvalent transition metal salt will be required to achieve appreciable substitution into the fibrous cerium phosphate structure.

The preferred procedure for bringing about the substitution will involve mixing the fibrous cerium phosphates with the soluble polyvalent transition metal salts at a pH below the precipitation point of the corresponding polyvalent metal ion hydroxides and slowly increasing the pH. This procedure is highly preferred if it is desired to exceed the level of substitution of 1 mole of the polyvalent metal ions for each phosphate group on the fibrous cerium phosphate. The reason for this is that if the pH initially too high, the soluble polyvalent metal salts will be precipitated and the polyvalent metal ions in such insoluble precipitates can only slowly be transferred from the precipitated metal hydroxide phase fibrous cerium phosphate structures. However, if this reaction is done sufficiently slowly and at high temperature it is possible to achieve degrees of substitution corresponding to 200 mole percent, or even slightly in excess of this, or polyvalent metal ions for each phosphate group in the fibrous transition metal phosphate.

The products of this invention are characterized by containing the +3 or +4 polyvalent metal ions of the type previously described, substituted for hydrogen atoms in the crystal structure of the fibrous cerium phosphates. They are further characterized in that they are positively rather than negatively charged. Thus they are substantive to, meaning they will deposit spontaneously from solution or be attracted to the surfaces of, negatively charged materials and will hold negatively charged materials at their surfaces. They are excellent substantive binders for papers, organic fibers of all sorts, organic plastics, as well as inorganic fibers such as glass fibers, rock wool insulation, aluminosilicate fibers, carbon fibers, and others. They can be dyed with negatively charged dye materials and can be employed as binders or mordanting agents between such negatively charged fibers and negatively charged dye materials. They can also function as binders between such negatively charged fibers and negatively charged colloidal materials, such as amorphous colloidal silica, negatively charged rubber latex dispersions, and the like.

Even a relatively small degree of substitution of the transition polyvalent metal ions substantially increases the refractory character of the fibrous cerium phosphates. It also increases their dimensional stability upon being heated at temperatures in excess of 200° C., as well as increasing their strength at elevated temperatures. Such substitution also minimizes the loss of phosphorus from the structure upon heating at high temperatures.

The polyvalent metal ion-substituted cerium phosphates have a substantial anion capacity, the degree of which increases as the degree of substitution with polyvalent metal ions increases. Thus these materials can be employed as ion exchange papers, as an ion exchange membrance, and as an ion exchange resin, whereas the prior art fibers of cerium phosphate have only a cation exchange capacity.

Derivatives of the compositions of the invention can be prepared wherein the surface of the polyvalent metal ion-substituted cerium phosphates can be bonded to a variety of organic acids. These can be aryl, alkyl, or halogen-substituted alkyl or aryl, such as chlorine-substituted or fluorine-substituted organic acids containing either a carboxylate, sulfate, phosphate, phosphonate, sulfonate, or a thiosulfate group. The alkyl, aryl or substituted alkyl or aryl portions of these organic acids may be either saturated or unsaturated. Polymeric acids may also be employed, such as partially hydrolyzed polyacrylamides of the type employed in the flocculation of alum for water purification or in ore-processing operations. Other polymeric acids such as polymethacrylic acid, polyacrylic acid, and the carboxymethyl cellulose, may also be used. Acids with other functional groups may also be employed, such as hydroxy acids of various types, amino acids, proteins containing free acidic end groups, and, in general, all organic acids may be employed.

Certain organic acids are preferred for particular uses. For example, when it is desired to make highly hydrophobic papers, fibers, threads, or cloth from the compositions of the invention, this may be done by employing long chain fatty acids such as stearic, oleic, myristic and the like, whereas both hydrophobic and oil resistant materials of this sort can be employed by using a fluorine-substituted organic acid.

A particular and preferred class of organic acid substituents are those which contain latent reactivity of a character capable of interaction with various types of thermoplastic and thermosetting organic resins. For example, when acrylic or methacrylic acid is adsorbed onto the surface of the positively charged fibers of the invention, these may then be employed as reinforcing fillers for a variety of resinous materials. Thus, by mixing the positively charged, polyvalent metal ion substituted, fibrous cerium phosphate products of the invention, the surfaces of which have been reacted with methacrylic acid, with a polyester resin and curing by free radical initiation, it is possible to link them permanently by copolymerization to such unsaturated resins. Similarly, hydroxy acids may be reacted onto the surface, or amino acids, and the resulting hydroxyl or amino groups may then be contacted with epoxy resins forming a permanent chemical bond between the organic acid absorbed onto the surface of the positively charged polyvalent metal ion-substituted fibrous cerium phosphate and the epoxy resin.

The organic acid reacted products of the invention can be made by contacting either the sodium salts, the ammonium salts, or other monovalent cation salts of the acid with the previously prepared, positively charged polyvalent metal ion-substituted fibrous cerium phosphates in aqueous solution or in some other solution such as alcohol, dimethylformamide, etc., in which the salt of the acid is soluble. Alternatively, the free acids may be employed for the same purpose. The surface-modified products centrifuging or in any convenient manner. Because these organic acids are chemically bonded to the inorganic transition metal ions of the fibrous substituted cerium phosphates, they can be extensively washed and will still retain the organic acid.

Because of the high affinity between positively charged transition metals of the type employed here and these organic acids, such reactions will usually be essentially quantitative in nature and the degree of substitution at the surface can thereby be controlled by the quantity of acid which is used. NOrmally, if complete surface coverage is desired, approximately stoichiometric amounts of such acids based on the number of positively charged transition metal ions in the structure which are located at the surface will be used. Larger amounts may, of course, be used and quantities up to two or three times those stoichiometrically required may be employed. Larger quantities than this serve no particular purpose, and would generally not be used. A partial substitution of the surface can be employed by using smaller than stoichiometric quantities.

The amounts required may be calculated based on the surface area of the fibrous polyvalent metal ion substituted phosphates which is generally of the order of approximately 25 m.2/g. It can be assumed that approximately four positively charged transition metal atoms will be located in each square millimicron of the surface and using these as guide points, the proper amount of organic acid to use can be calculated by one skilled in the art.

The compositions of this invention are useful as reinforcing fillers, as noted above, for a variety of thermoplastic and thermosetting organic resins. They are useful in a variety of refractory applications, as binders for refractory fibers, as noted previously, to prepare refractory paper, cloth, thread and the like.

The are also useful as anion exchange resins or as mixed anion-cation exchange resins, and may also be formed into membranes, papers, etc., and employed as battery separators and for similar purposes.

The following examples represent the practices of this invention.

EXAMPLE 1

Four hundred and fifteen grams of ceric sulfate was dissolved in 5.1 of 0.5 molar sulfuric acid giving a solution which is 0.25 molar in ceric sulfate. 2.5 Liters of the solution are added dropwise to 2.5 liters of 6 molar phosphoric acid, which has previously been heated to a temperature of 94°. Vigorous agitation is maintained by a paddle stirrer during the addition. The addition is carried out over a period of 8 hours, at the end of which the solution is heated with continued stirring for approximately 5 more hours. It is then allowed to cool overnight. The resulting fibrous cerium phosphate is filtered and washed by reslurrying several times with water. Electron micrographs show that this product consists of fibers approximately 25 millimicrons in diameter and 10 or more microns long. This is reslurried in water to give a concentration of 4.38 percent solids.

A solution of zirconium oxychloride is prepared containing 26 g. of the oxychloride in 1 liter of water which has a pH of 2.5. While stirring rapidly, X 1 liter of the cerium phosphate solution is added to the zirconyl chloride solution. After mixing about 10 minutes, this is a permanently stable, positively charged sol containing 60 mole percent zirconium, based on the phosphate groups in the cerium phosphate.

To prepare an organic acid substituted composition of the invention, an aqueous solution of 2.28 g. of methacrylic acid corresponding to one-third mole of methacrylic acid/mole of zirconium contained in the substituted fibrous cerium phosphate is added to 1 liter of the product just prepared, and is heated to 65° C. to form a stable, colloidal suspension of positively charged zirconium-substituted fibrous cerium phosphate containing surface bound methacrylic acid groups.

This is centrifuged, washed, and dried, and is then mixed with a sample of polyester resin syrup in the amount of 25 volume percent of the zirconium-substituted, methacrylic acid reacted, fibrous cerium phosphate based on the volume of the polyester resin solids contained in the syrup. This is cast in the form of a sheet and cured with a peroxide initiator under heat and pressure under conditions typical for polyester resins. The resultant product has approximately double the tensile strength and more than 100 times the modulus of an otherwise identical polyester sheet which does not contain the methacrylic acid-substituted zirconium fibrous cerium phosphate. Even after boiling in water for 3 hours, it is found that 90 percent of the strength and reinforcing action of the filled polyester sheet is retained. This indicates that there is a permanent chemical bond established between the reinforcing filler and the polyester resin.

EXAMPLE 2

One liter of the 4.38 percent solids washed cerium phosphate solution of example 1 containing 0.25 mole of phosphate groups is mixed with 125 millimoles of aluminum nitrate in the form of a 1 molar aluminum nitrate solution. The pH of this mixture is slowly increased to 4.5 by the addition of dilute ammonium hydroxide while the solution is heated at 50° C. The solution peptizes when the pH reaches this point, and this represents a positively charged solution of aluminum substituted cerium phosphate containing 5 mole percent aluminum based on the number of available phosphate groups.

EXAMPLE 3

A concentrated solution of titanium tetrachloride in water is prepared by hydrolyzing anhydrous titanium tetrachloride with ice and the resulting solution adjusted to a 5 molar concentration in titanium ions. The pH of this solution is too low to read accurately with a conventional pH meter, but is approximately zero. One hundred cc. of this 5 molar solution are delivered dropwise into 1 liter of the 4.38 percent washed suspension of fibrous cerium phosphate of example 1, while sufficient dilute ammonium hydroxide is simultaneously delivered into the same solution to maintain the pH at 2.0. The resulting stable, colloidal suspension containing positively charged ions has 200 mole percent titanium based on the number of moles of phosphate present in the cerium phosphate.

To this solution is added 1 liter of a 0.025 normal solution of sodium stearate in water while the solution is stirred vigorously and heated to 60° C. The addition of the sodium stearate solution causes a flocculation of the colloidally dispersed, positively charged, titanium-substituted cerium phosphate fibers, and these are washed and dried at 100° C. The resulting fibers after drying are extremely hydrophobic and represent a substantially fully surface-coated cerium phosphate fiber. Three percent of these fibers by weight are mixed with a lubricating oil and milled for seven passes in an ink mill. The resulting thick grease has excellent water resistance, as shown by tests in boiling water, good mechanical properties on working, and shows excellent thickening characteristics even when heated to 100° C.

EXAMPLE 4

A 1 molar solution of stannic chloride in water is prepared by dissolving anhydrous stannic chloride in a mixture of ice and water in the presence of a 2 molar solution of hydrochloric acid. One hundred cc. of this solution are mixed with a liter of the fibrous cerium phosphate solution containing 4.38 percent solids prepared as described in example 1, and the pH of this solution is slowly raised to above 1.0 by deionization with the hydroxyl form a strong base anion exchange resin while the dispersion is vigorously stirred. At a pH of about 1, the dispersion peptizes to give a positively charged, stable dispersion of fibrous cerium phosphate with 40 percent of the available ion exchange sites occupied by stannic ions.

EXAMPLE 5

One liter of the 4.28 percent solids concentration suspension of negatively charged fibrous phosphate prepared as described in example 1 are mixed with a solution of basic chromic chloride containing 0.25 mole of chromium per 100 cc. One hundred cc. of this solution are delivered dropwise into a stirred zone containing the fibrous phosphate while the pH is maintained at a value of 5.3 by the addition of dilute ammonium hydroxide. The resulting, slightly greenish-tinged, positively charged colloidal suspension contains one chromium atom substituted for each phosphate group in the fibrous cerium phosphate. This solution is contacted with an excess of the sodium salt of perfluorooctanoic acid, which results in the flocculation of the positively charged fibrous suspension. After this is washed and the excess of sodium perfluorooctanoic acid removed, the resulting fibers are extremely hydrophobic, and also extremely oleophobic. The flocculation and filtration results in the formation of a paperlike matt which has excellent grease-resistant and water-resistant properties.

EXAMPLE 6

A liter of 1 molar ferric nitrate is mixed with a liter of the 4.38 percent solid solution of cerium phosphate of example 1, and a large excess of urea is added while the ferric nitrate solution is boiled. The boiling slowly raises the pH of the resulting suspension and after 24 hours the precipitate consists of a dark red, fibrous material which is positively charged, as shown by its ability to flocculate negatively charged colloidal silica solutions and which contains 400 mole percent of iron based on the phosphate groups present in the original cerium phosphate suspension.

EXAMPLE 7

A solution containing 0.25 mole per liter of ceric sulfate is prepared, and this is mixed with 1 liter of the ceric phosphate of example 1, containing 4.38 percent solids. The pH of this solution is slowly increased to 2.7, at which point the dispersion peptizes and forms a stable colloidal suspension of cerium-substituted positively charged cerium phosphate. This solution contains one cerium atom for each phosphate group in the form of a positively charged cerium ion. The clear colloidal suspension is flocculated with 1,000 cc. of a one hundredth of 1 percent solution of a partially hydrolyzed polyacrylamide. ("Separan, n.p. 20"). When dried on the filter paper and heated in an oven at 100° C., the resulting product forms a very tough paper which is not redispersible in water. Contacting this paper with solutions containing a large excess of anions other than the sulfate ion including nitrate, chloride, hydroxyl, and acetate, all in the form of their sodium salts, results in a substantially complete displacement of the sulfate ions from the structure, and their replacement by the anions of the particular salt which was employed in excess.

EXAMPLE 8

The process of example 1 is repeated exactly as described in example 1 up to the point where the permanently stable, positively charged sol containing 60 mole percent zirconium based on the phosphate groups in the cerium phosphate are obtained. At this point, the solution is contacted with the sodium salt of an alkyl aryl sulfonate detergent having an average alkyl chain length of 12 carbon atoms, an average degree of sulfonation of the benzene ring of one sulfonic acid group per each benzene ring with the detergent being present in a large excess over that required for surface coverage. After washing the flocculated precipitate, it is found to be largely hydrophobic and forms an excellent thickening and dispersing agent for the formation of stable oil-in-water dispersions. It is also an excellent foaming agent when air is beaten into it for forming stable aqueous foams.

What is claimed is:

1. A fibrous crystalline cerium phosphate exhibiting a positive charge in an aqueous solution and containing at least 5 mole percent based on the number of moles of phosphorus of at least one +3 to +4 valent metal ion from the group consisting of titanium, zirconium, hafnium, chromium, molybdenum, tungsten, manganese, aluminum, iron, cobalt, cerium, the rare earths, thorium, tin and lead, said metal ions being substituted in the lattice positions originally occupied by the hydrogen ions of said cerium phosphate.

2. A fibrous crystalline cerium phosphate as in claim 1 where said metal ions are chromium, aluminum, titanium or zirconium.

3. A fibrous crystalline cerium phosphate as in claim 1 where the surface atoms of the polyvalent metal ions are bonded to an organic acid.

4. A fibrous crystalline cerium phosphate as in claim 3 where said organic acid is an unsaturated acid.

5. A fibrous crystalline cerium phosphate as in claim 4 where said acid is acrylic or methacrylic acid.

6. A fibrous crystalline cerium phosphate as in claim 3 where said acid is a fatty acid or a fluorinated acid.

7. A process for preparing crystalline fibrous cerium phosphate exhibiting a positive charge in an aqueous solution which comprises contacting in an aqueous medium fibrous cerium phosphate with at least one +3 or +4 valent metal ion from the group consisting of titanium, zirconium, hafnium, chromium, molybdenum, tungsten, manganese, aluminum, iron, cobalt, cerium, the rare earths, thorium, tin or lead while maintaining the pH of the reaction from 3 pH units below to 1.5 pH units above the precipitation point of the hydroxide of a salt of said metal when the salt is contacted with an alkaline hydroxide, said reaction introducing at least 5 mole percent based on the moles of phosphorous in said cerium phosphate of said metal into the structure of said cerium phosphate.

* * * * *